United States Patent [19]

Peterson et al.

[11] Patent Number: 4,719,627
[45] Date of Patent: Jan. 12, 1988

[54] MEMORY SYSTEM EMPLOYING A LOW DC POWER GATE ARRAY FOR ERROR CORRECTION

[75] Inventors: LuVerne R. Peterson; Stephen J. Chung Chan, both of San Diego, Calif.

[73] Assignee: Unisys Corporation, Detroit, Mich.

[21] Appl. No.: 835,777

[22] Filed: Mar. 3, 1986

[51] Int. Cl.⁴ .................................. G06F 11/00
[52] U.S. Cl. ................................ 371/38; 371/13
[58] Field of Search .................. 371/37, 38, 39, 40, 371/13, 14, 15

[56] References Cited

U.S. PATENT DOCUMENTS

| | | | |
|---|---|---|---|
| 4,394,763 | 7/1983 | Nagano | 371/38 |
| 4,456,996 | 6/1984 | Haas | 371/38 |
| 4,593,393 | 6/1986 | Mead | 371/38 |
| 4,641,310 | 2/1987 | Martens | 371/38 |
| 4,646,304 | 2/1987 | Fossati | 371/38 |

Primary Examiner—Michael R. Fleming
Attorney, Agent, or Firm—Charles J. Fassbender; L. Joseph Marhoefer

[57] ABSTRACT

An error-correcting memory system includes a storage module which receives an address during a read cycle and which reads data bits and check bits at the address, and it further includes a low DC power logic circuit which corrects errors in the data bits by decoding multiple minterms from the check bits; wherein the logic circuit is comprised of: a plurality of logic gates, one for generating each of the minterms by passing a constant power dissipating current to selectively decode the check bits; a control circuit for generating a control signal that is in one state during only a small fraction of the read cycle and is otherwise in an opposite state; and an enabling circuit, coupled between the control circuit and the logic gates, for enabling their selective decoding by permitting the constant current to flow through the gates only while the control signal is in its one state.

8 Claims, 9 Drawing Figures eq1 → $P_A = V_{DD} I$ eq2 → $P_{ER} = P_A (136)$ eq3 → $P_T = P_{ER} (118)$ eq4 → $V_{DD} = 5$ VOLTS, $I = 0.2$ Ma, $P_T = 160$ WATTS eq5 → $P_T$ (GATE 51) $= 160(1/8)(2/3) = 13.3$ WATTS eq6 → $P_T$ (GATE 53) $= 0.01$ WATTS @ ERROR RATE OF 1/1000

MEMORY SYSTEM EMPLOYING A LOW DC POWER GATE ARRAY FOR ERROR CORRECTION

BACKGROUND OF THE INVENTION

This invention relates to memory systems which store digital data and use logic gate arrays to correct errors in the data; and more particularly, it relates to systems of the above type which operate on a low DC (direct current) power.

In the prior art, perhaps the most widely used memory systems are those which employ dynamic RAM (DRAM) chips. Several million of these DRAM Chips are sold each year. Presently, a single DRAM chip is capable of storing 256,000 bits of information; whereas ten years ago, a single DRAM chip could store only about 1,000 bits.

To a large extent, this increase in the number of bits in a single DRAM chip has been achieved by shrinking the geometries of the various circuit patterns which make up the chip and thereby reduce the size of each memory cell. However, as the size of the DRAM memory cell decreases, that cell becomes more susceptible to "soft" errors.

Soft errors are of a transient nature and occur randomly within the chip. Alpha particles, as emitted by trace amounts of impurities which exist within the chip itself, are a common source of soft errors. Once emitted, the alpha particles generate electron hole pairs; and they alter the charge that is stored in a cell as information. As the cell becomes smaller, the amount of charge alteration that can occur without producing an error decreases.

Accordingly, in an effort to avoid the soft error problem, memory systems employ error-correcting codes. With such systems, an error code is written into the DRAM chips along with the data. This error code is generated such that it allows errors which occur in the data during storage to be corrected when the data is read from the memory. Hamming codes are a common example of these error-correcting codes; and they are described at pages 126–128 in a book entitled *Computer Networks* by Andrew Tanenbau, 1981, Prentice-Hall, Inc. Other codes are also described in this book.

A problem however, with error-correcting codes is that the required number of check bits increases with the number of data bits per data word and with the number of errors which are to be corrected per data work. For example, page 127 of the above book gives the formula $m+r+1<2^r$ which must be met for Hamming codes that correct single bit errrors, wherein m is the number of data bits per word, and r is the number of check bits per word.

If the stored data word is one hundred eighteen bits and two errors are to be corrected via Hamming codes in that data word, then seventeen check bits are needed per data word. These check bits have $2^{17}$ or 131,072 different binary combinations; and these binary combinations must be decoded when an error occurs to determine which bits in the data word need to be corrected. Such decoding requires a huge amount of logic which in turn dissipates a proportionate amount of power. Thus a problem exists of how to design this circuitry such that its power dissipation is reduced to the point where the system can be integrated on a small number of semiconductor chips without exceeding each chip's maximum power dissipation.

Accordingly, a primary object of the invention is to provide a memory system in which the above described power dissipation problem is substantially reduced.

BRIEF SUMMARY OF THE INVENTION

A memory system which is contructed in accordance with the invention includes a storage module which receives an address during a read cycle and which reads data bits and check bits at the address, and a low DC power logic circuit which corrects errors in the data bits by decoding multiple minterms from the check bits; wherein the logic circuit is comprised of: a plurality of logic gates, one for generating each of the minterms by passing a constant power dissipating current to selectively decode the check bits; a control circuit for generating a control signal that is in one state during only a small fraction of the read cycle and is otherwise in an opposite state; and an enabling circuit, coupled between the control circuit and the logic gates, for enabling their selective decoding by permitting the passage of the constant current through the gates only while the control signal is in its one state.

In one specific embodiment, the logic gates receive input signals which are derived from the check bits and pass their current only when the input signals are at a certain voltage, and the enabling circuit responds to the opposite state of the control signal by forcing the input signals out of that voltage level.

BRIEF DESCRIPTION OF THE DRAWINGS

Various features and advantages of the invention are described in the Detailed Description in conjunction with the following drawings wherein.

DETAILED DESCRIPTION OF THE INVENTION

Figure 1:
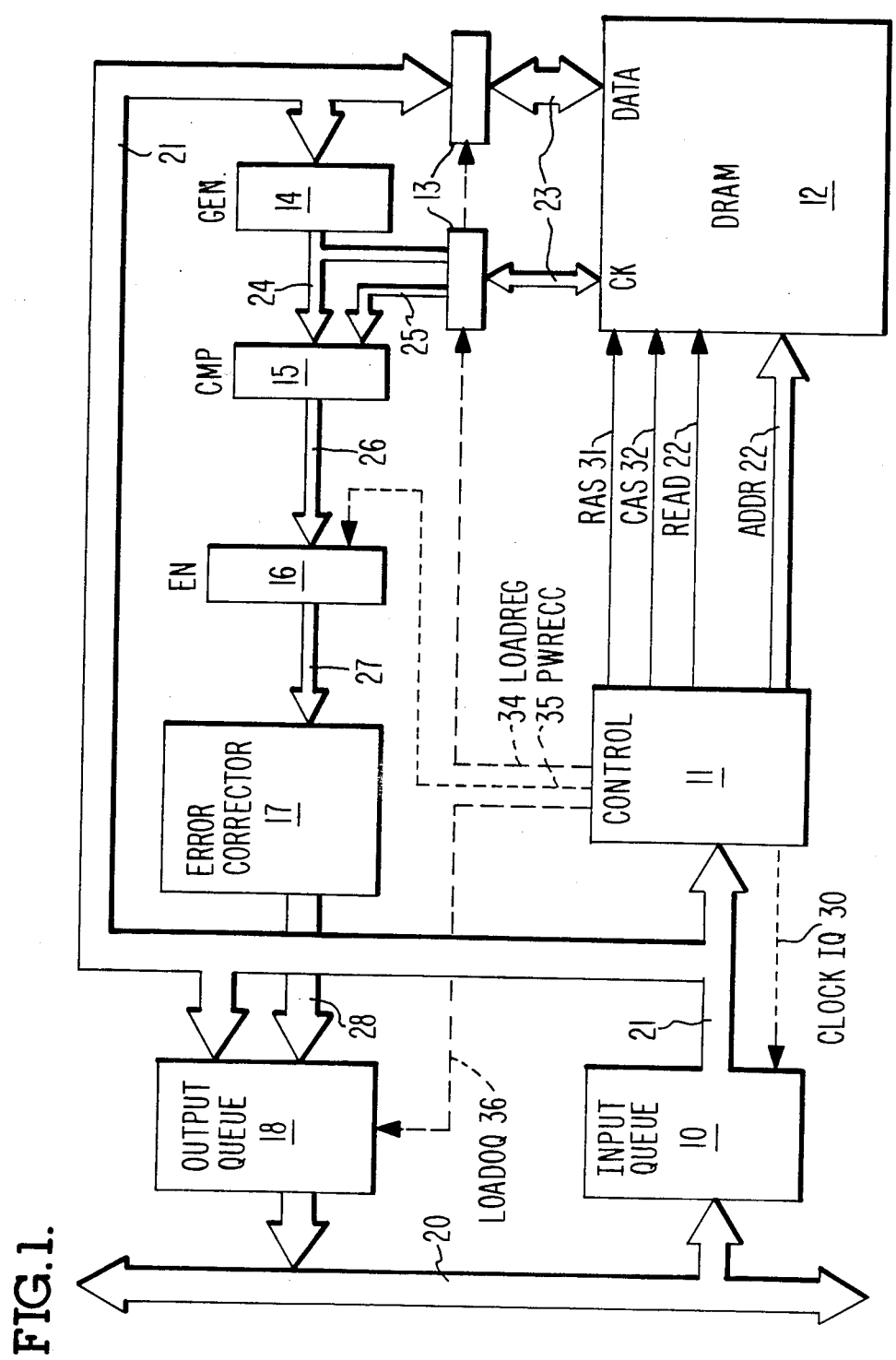
FIG. 1 shows a memory system which is constructed in accordance with the invention.

Beginning now with FIG. 1, the details of a memory systme which is constructed in accordance with the invention to have a low power dissipation will be described. This system includes an input queue 10, a control module 11, a dynamic RAM 12, a register 13, a check bit generator 14, a comparator 15, a power enabling module 16, an error correction module 17, and an output queue 18. All of these units are interconnected via buses 20 thru 28 as illustrated in FIG. 1. In addition, these units are also interconnected via conductors 30 thru 36 as shown which carry control signals from control module 11.

In operation, read and write commands for the dynamic RAM 12 are sent to input queue 10 over bus 20 from ultiple devices (not shown) which are connected to the bus. These commands are then sequentilly removed from queue 10 over bus 21 by control module 11. Each such command includes an address which control module 11 sends tot he dynamic RAM 2 over bus 22.

When the command is a write command, one hundred eighteen bits of data ccompany it int he queue 10. That data is sent on bus 21 to generator 14 which generates seventeen check bits. These check bits along with the data bits are written into register 13 and then into the dynamic RAM 12 at the address on bus 22.

When the command is a read command, one hundred eighteen data bits and seventeen check bits are accessed from the RAM 12 at the address on bus 22. Those bits are loaded into register 13 and then sent on bus 21 to the check bit generator 14. This generator regenerates the same seventeen check bits that were initially stored in the dynamic RAM 12 along with the data. Thus, if no error occurred to the data bits in dynamic RAM 12, then the check bits from generator 14 will be the same as the check bits in register 13.

Comparator 15 detects any discrepancy between the check bits from generator 14 and the check bits in register 13. It compares those check bits and produces seventeen syndrome bits on bus 26 which indicate the result of the comparison. If any of the syndrome bits are not zero, then an error exists in the data bits.

All of the syndrome bits on bus 26 along with a power error correction module (PWRECC) signal on conductor 35 are sent to the power enabling module 16. That module responds to its received signals by enabling the operation and dissipation of power in the error correction module 17. When the error correction module 17 is enabled, it generates one hundred eighteen error correciton signals (ER1 thru ER118) from the seventeen syndrome bits and sends them on bus 28 to output queue 18. If the ith error signal ERi is ture, then the ith bit of the data on bus 21 is in error and must be inverted in the output queue 18 to be corrected.

Figure 2:
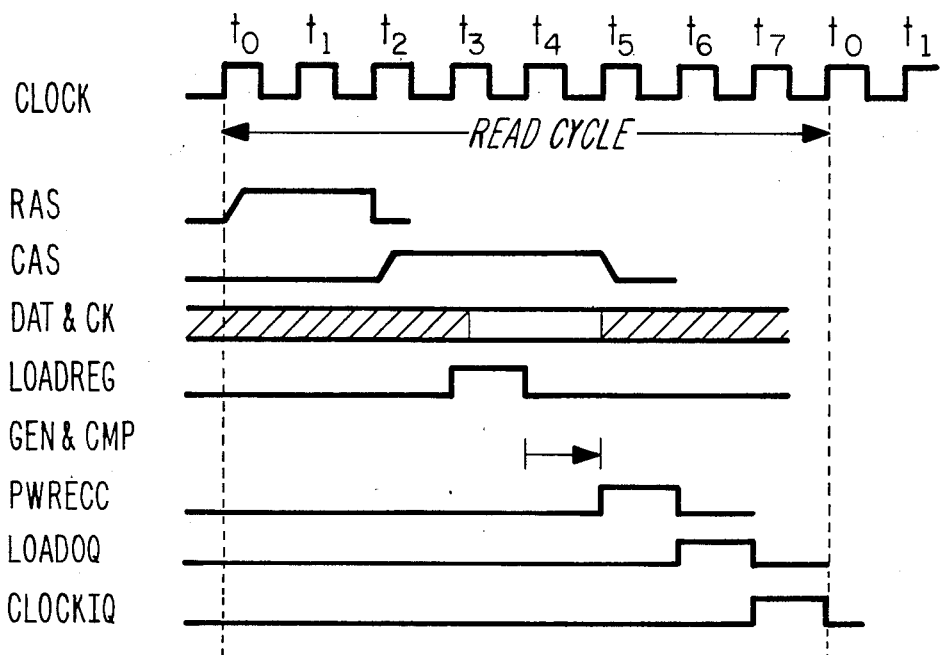
FIG. 2 shows the timing by which various signals occur during a read cycle in the FIG. 1 memory system.

Reference should now be made to FIG. 2 which illustrates in further detail the timing sequence by which the read command is executed. As is there shown, each read command is executed during a read cycle which consists of eight sequential clock pulses $t_0$ thru $t_7$. One clock pulse lasts forty-five nanoseconds. From time $t_0$ to time $t_2$, module 11 forces a row address signal (RAS) true on conductor 31, and from time $t_2$ to time $t_5$, module 11 forces a column address signal (CAS) true on conductor 32. Row addresses and column addresses are sent to the dynamic RAM on bus 22 along with the RAS and CAS signals.

At about halfway between time $t_3$ and time $t_4$, the dynamic RAM 12 responds to the RAS and CAS signals by sending data bits and check bits on bus 23 from the addressed location. These bits are latched in register 13 in response to a load register (LOADREG) signal that is sent by control module 11 on conductor 34. From register 13, the data bits and check bits pass through generator 14 and comparator 15 to produce the seventeen syndrom bits on bus 26. These become stable at about time $t_5$.

From time $t_5$ to time $t_6$, control module 11 forces the PWRECC signal true on conductor 35; and in response, the enabling circuit 16 passes the syndrom bits on bus 26 to the error correction module via bus 27. At all other times during the read cycle, the PWRECC signal is false; and in response, the power enabling circuit forces the signals on bus 27 into a state which produces no DC power dissipation in the error correction module.

To complete the read cycle, control module 11 at time $t_6$ sends a load output queue (LOADOQ) signal on conductor 36 to output queue 18. This indicates to the output queue that the error correction signals on bus 28 are stable and can be utilized to correct any errors in the data on bus 21. Finally, at time $t_7$, control module 11 sends a clock input queue (CLOCKIQ) signal to the input queue on conductor 30 which causes the input queue to put the next command for the memory system on bus 21.

Figure 3:
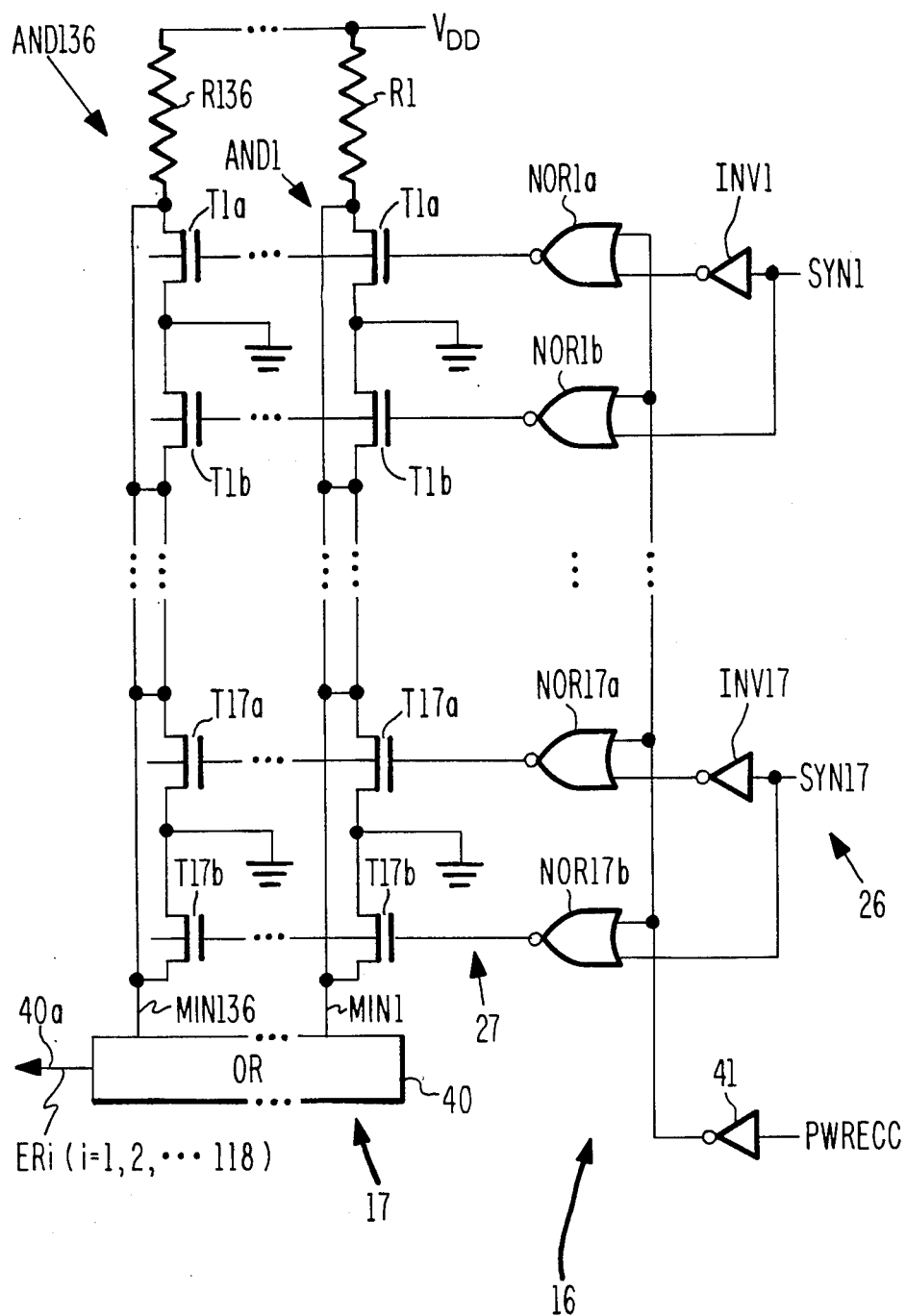
FIG. 3 is a detailed circuit diagram of an enabling module and error correction module in the system of FIG. 1.

Turning next to FIG. 3, the detailed makeup of one embodiment of the power enabling module 16 and error correction module 17 will be described. In this embodiment, module 16 includes seventeen inverters labeled INV1 thru INV17, and seventeen pairs of NOR gates labeled NOR1a, NOR1b thru NOR17a, NOR17b. These gates are interconnected as illustrated.

Module 17 includes one hundred thirty-six AND gates labeled AND1 thru AND136. Each such AND Gate is made up of seventeen transistor pairs. These transistor pairs are labeled T1a, T1b thru T17a, T17b. All of these transistors are interconnected as illustrated. Interconnections between the conductors of bus 27 and the gates of the transistors are mask programmable to thereby tailor the ANDing operation in accordance with the error correction codes that are being employed.

Each of the AND gates is coupled to receive a bias voltage $V_{DD}$ from a bus through a respective load resistor R1 thru R136. Output signals from these AND gates are minterms called MIN1 thru MIN136, and they are all ORed together by a single OR gate 40. This OR operation produces just one of the error correction signals ER1 thru ER118 on a conductor 40a; and so the circuit of FIG. 3 is repeated one hundred eighteen times in the enabling module 16 and error correction module 17 of FIG. 1.

In operation, the inverse of the PWRECC signal is sent from an inverter 41 to each of the NOR gate pairs NOR1a, NOR1b thru NOR17a, NOR17b. Thus, when PWRECC is false, the output voltage from each of the NOR gate pairs is low. In turn, that low output voltage turns off all of the transistors which make up the AND gates AND1 thru AND136. With those transistors turned off, no current flows from the $V_{DD}$ voltage bus through the load resistors R1 thru R136; and consequently, no power is dissipated.

Conversely, when the PWRECC signal is true, the state of the syndrome bits SYN1 thru SYN17 determines the state of the output signals from the NOR gates. For example, if SYN1 is true then the output voltage of gate NOR1a is high and the ouput voltage of gate NOR1b is low; and vice versa. These output voltages from the NOR gates then determine which of the transistors in the AND gates AND1 thru AND136 turn on and which of those transistors turn off. When any transistor of a particular AND gate turns on, current flows through that AND gate's load resistor and thereby dissipates power.

Figure 4:
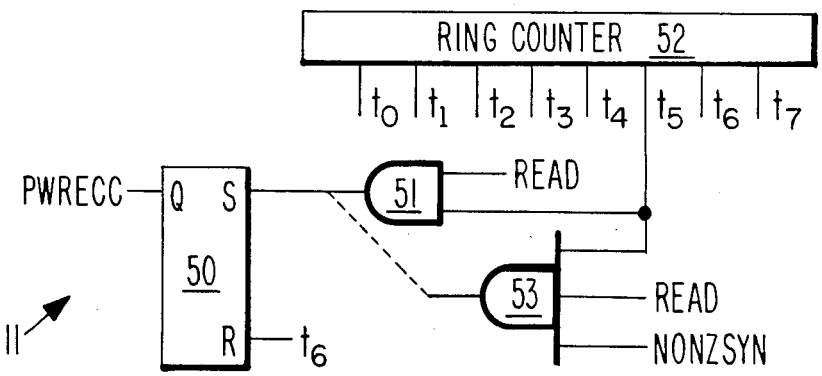
FIG. 4 is a detailed logic diagram of a control module in the system of FIG. 1.

Referring next to FIG. 4, the details of the circuit in control module 11 which generates the PWRECC signal will be described. This circuit includes a flip-flop 50, and AND gate 51, and an eight stage ring counter 52, all of which are interconnected as illustrated in FIG. 4.

Signals $t_0$–$t_7$ are generated by ring counter 52, and signal PWRECC is generated from the Q output of flip-flop 50. That flip-flop is set by AND gate 51 at time $t_5$ only if a read cycle is being performed, and it is always reset at time $t_6$.

Thus, as shown in FIG. 2, the PWRECC signal is false through seven-eights of each read cycle, and it is false throughout every write cycle. As a result, the power which the error correction module 17 would otherwise dissipate is reduced by a factor of one-eight times the ratio of read cycles to total read-write cycles. Assuming a ratio of two read cycles per write cycle, the power in the error correction module 17 is reduced by a factor of one-twelfth.

Also shown in FIG. 4 is another AND gate 53 which can replace AND gate 51 to further reduce the power in the error correction module 17. Gate 53 sets flip-flop 50 at time $t_5$ during a read cycle only if all seventeen of the syndrome bits are not zero. Signal NONZSYN to AND gate 53 is formed by ORing the true state of all seventeen syndrome bits. All the syndrome bits are zero whenever there is no error in the data bits in register 13; and as a conservative estimate, the ratio of read cycles with errors to total read cycles is about one per thousand.

Figures 5, 9:
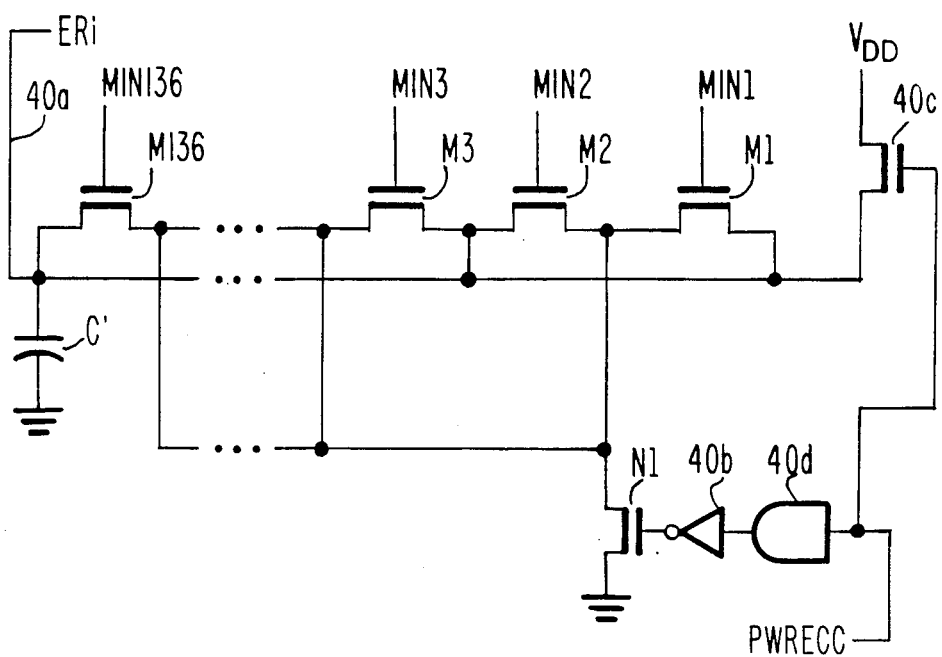
FIG. 5 is a set of equations which show the power that is dissipated in the system of FIG. 1.
FIG. 9 is a detailed circuit diagram of an embodiment for the OR gate in FIG. 7.

Some numerical examples of what this all means in terms of power savings are given in FIG. 5. There, equation 1 gives the DC power per AND gate ($P_A$) of the FIG. 3 circuit as the voltage $V_{DD}$ times the current (I) that flows through the AND gate's load resistor when any one of the AND gate's transistors are turned on. To generate one error correction signal requires one hundred thirty-six AND gates, and so equation 2 states that the power per error correciton signal ($P_{ER}$) equals $P_A \times 136$. Further, there are a total of one hundred eighteen error correction signals, so equation 3 states that the total power $P_T$ which the error correction module dissipates is $P_{ER} \times 118$.

Typical values for the voltage $V_{DD}$ and current I are 5 volts and 0.2 milliamps respectively. This, as stated by equation 4, yields a total power $P_T$ of 160 watts. Such wattage is so large that it will destroy any single semiconductor chip in which the error correction circuitry is implemented. A realistic power dissipation per chip is only about 5 watts; so to build an error correction module that dissipates 160 watts would require thirty-two chips.

By comparison, equation 5 states that by the incorporation of the enabling circuit 16 and the AND gate 51 version of module 11, the 160 watts is reduced to only 13.3 watts. This, assuming a maximum power dissipation of 5 watts per chip, enables all of the error correction circuitry to be implemented on a total of just three chips.

Each of these three chips would contain one-third of the one hundred eighteen circuits of FIG. 3. Thus, the total number of AND gates per chip would be $(118 \div 3)(136)$ or 5,440; the total number of OR gates per chip would be $(118 \div 3)$ or 40; the total number of NOR gates per chip would be $(118 \div 3)(17)(2)$ or 1,360; and the total number of INVERTER gates per chip would be $(118 \div 3)(18)$ or 720. This yields a total gate count of 7,560 (5,440 of which would not continuously dissipate power) which, with today's technology, easily fits on one chip.

Further, equation 6 states that with the incorporation of AND gate 53 into the FIG. 4 circuit, the 160 watts is reduced to less than one watt. This allows all of the error correction circuitry to be implemented on just a single semiconductor chip.

Figure 6:
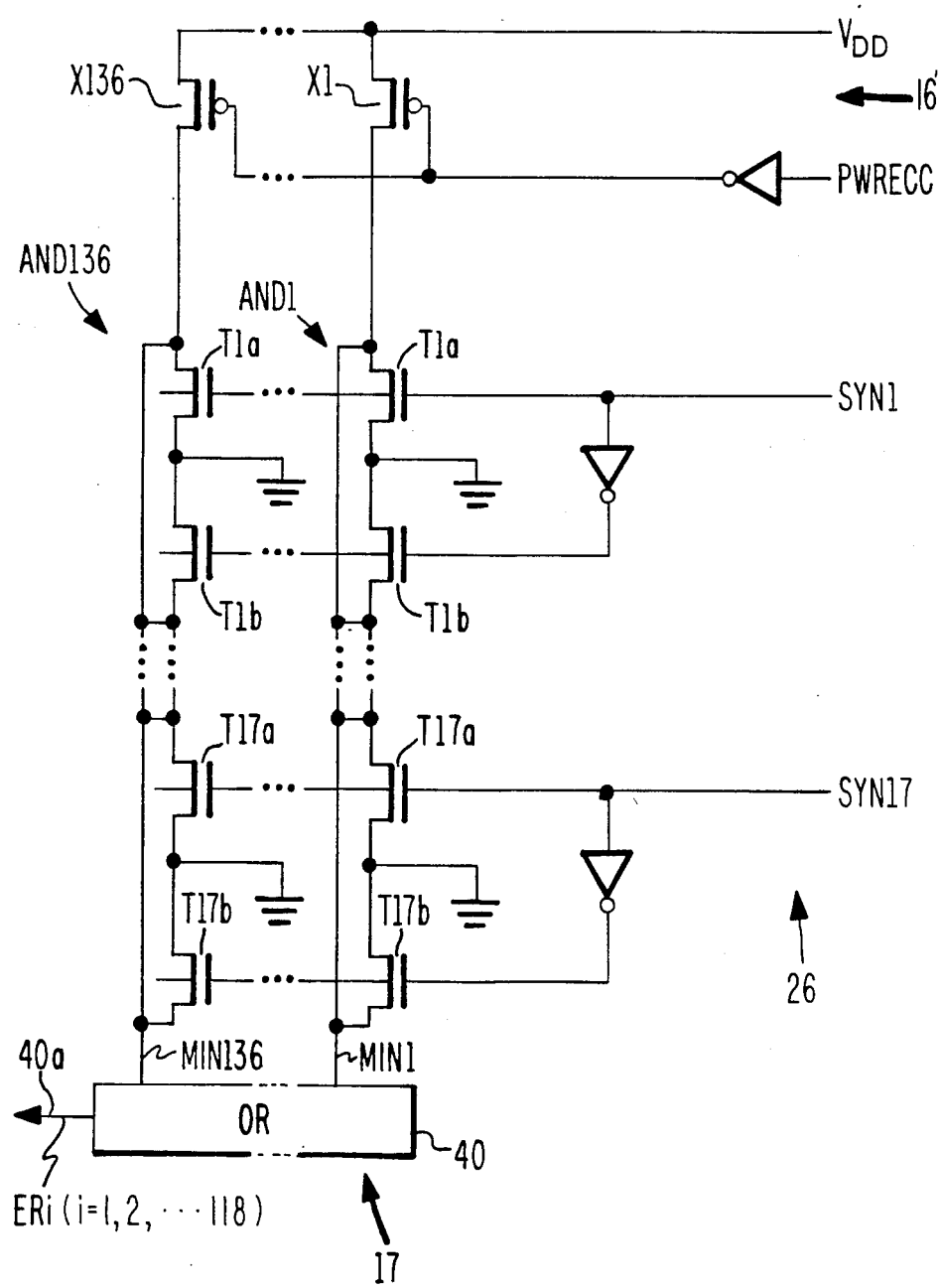
FIG. 6 is a detailed circuit diagram of one alternative embodiment for the enabling module and error correction module in the system of FIG. 1.

Turning now to FIG. 6, an alternative embodiment for the power enabling module 16 will be described. This embodiment is indicated by reference numeral 16' and it is shown together with its connections to the error correction module 17.

Module 16' includes one hundred thirty-six transistors labeled X1 thru X136. These transistors respond to the PWRECC signal to couple and decouple the bias voltage $V_{DD}$ to the AND gates AND1 thru AND136. To that end, transistors X1 thru X136 have their gate voltage coupled to the PWRECC signal such that they turn on only when that signal is true.

When the transistors X1 thru X136 are turned off, no current flows from the $V_{CC}$ bus through the gates AND1 thru AND136. Thus, zero DC power dissipation occurs regardless of the state of the syndrome bits. Conversely, when transistors X1 thru X136 turn on, the error correction module dissipates power while it operates on the sydrome bits to generate the error correction signals. This FIG. 6 circuit, just like the FIG. 3 circuit, generates only one of the error correction signals; and so in the error correction module 17, it is repeated one hundred eighteen times.

Figure 8:
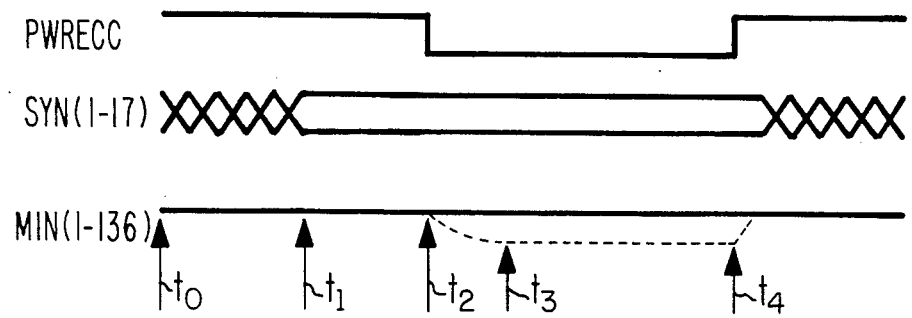
FIG. 8 is a timing diagram showing the operation of the FIG. 7 circuit.
Figure 7:
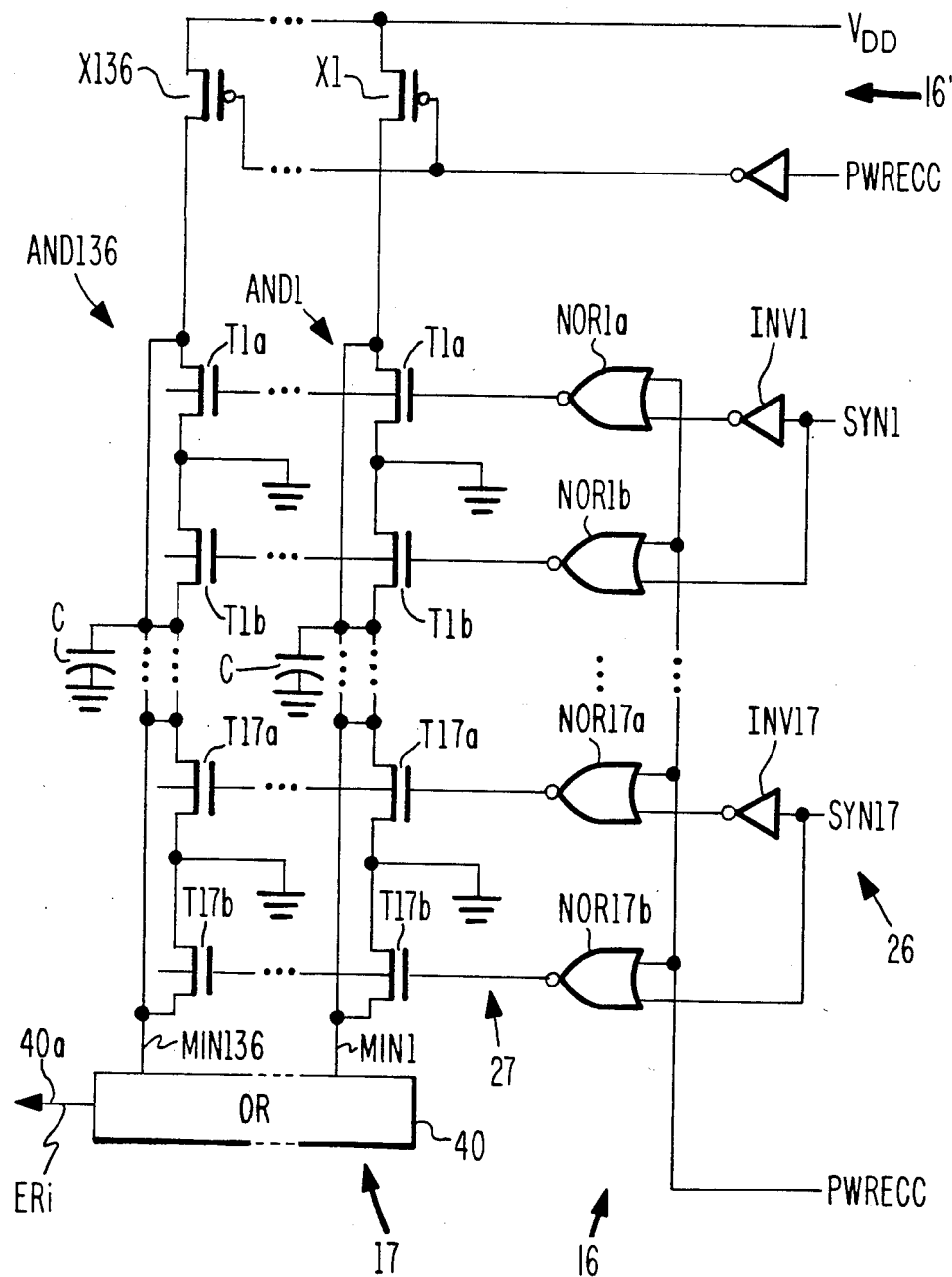
FIG. 7 is a detailed circuit diagram of another alternative embodiment for the enabling module and error correction module in the system of FIG. 1.

Next, reference should be made to FIGS. 7 and 8 wherein the structure and operation of still another embodiment of the invention will be described. With this embodiment, both the power enabling module 16 of FIG. 3 and the power enabling module 16' of FIG. 6 are coupled to the previously described error correction module 17 and gate 41 is eliminated. In FIG. 7, the reference numerals which indicate the various components of modules 16, 16' and 17 are the same as those previously used in FIGS. 3 and 6.

Also in the FIG. 7 embodiment, the conductors on which the minterms are formed are each coupled to ground via a respective capacitor C. Thus there are one hundred thirty-six such capacitors. Each capacitor C may be formed as a reverse biased P-N diode junction, or as a pair of spaced apart parallel plates. Also it may be located at one point on the minterm carrying conductor or distributed along that conductor. Preferably, capacitor C is 0.05–5.00 pf.

A primary feature of the FIG. 7 embodiment is that its DC power dissipation is reduced essentially to zero. How this is achieved may be understood by an analysis of the signal waveforms of FIG. 8. There, from time $t_0$ to time $T_2$, signal PWRECC is high. As a result, the transistors X1 thru X136 in module 16' turn on; and at the same time, all of the output signals from the NOR gates in module 16 are forced low. Thus only a short transient current flows through the transistors X1 thru X136 to charge the capacitors C which are present on the conductors that carry the minterm signals MIN1 thru MIN136. Once these capacitors C charge to voltage $V_{DD}$, no further current flow occurs.

After the syndrome signals SYN1 thru SYN17 stabilize, the PWRECC signal is forced low. FIG. 8 shows the signals SYN1 thru SYN17 stabilizing at time $t_1$ and the PWRECC signal going low at time $t_2$. When signal PWRECC is low, transistors X1 thru X136 in module 16' turn off and thus prevent any further charging of the capacitors C. At the same time, the output signals of the NOR gates in module 16 will be either high or low depending upon the state of the syndrome signals SYN1 thru SYN17.

Any high output signal from a NOR gate which is coupled to a transistor of a particular AND gate will discharge the capacitor C of that AND gate. For example, the capacitor C of AND gate 13$6$ will discharge if the output signal from NOR gate 1$a$ is high and is coupled to transistor T1$a$ in AND gate 13$6$. Such a discharge is shown in FIG. 8 as occuring between time $t_2$ and $t_3$.

After the discharge of the capacitor C, the minterm signals MIN1 thru MIN136 will remain essentially stable so long as signal PWRECC stays low. Each capacitor C will have a small leakage current which will cause them to slowly discharge; but this discharge due to leakage will be negligible over a time period of several microseconds. During that time, the OR of the minterm signals from gate 40 may be used directly or latched in a flip-flop. Thereafter, the sequence from time $t_0$ to time $t_4$ can be repeated by forcing signal PWRECC high which will cause the capacitors C to recharge.

Next, referring to FIG. 9, the details of a preferred embodiment of OR gate 40 will be described. This OR gate includes a plurality of transistors M1 thru M136 (one for each minterm), another transistor N1, an inverter 40$b$, another transistor 40$c$, a capacitor C', and an AND gate 40$d$. All of these components are interconnected as illustrated in FIG. 9. In particular, each minterm signal MIN1 thru MIN136 is respectively coupled to the gate of one of the transistors M1 thru M136. Thus a high MIN1 signal turns on transistor M1; a high MIN2 signal turns on transistor M2; etc.

As was explained above in conjunction with FIG. 8, all of the minterms are high during the time period when control signal PWRECC is high. Thus, during that time period, all of the transistors M1 thru M136 turn on and thereby short conductor 40$a$ to transistor N1. However, transistor N1 is turned off when signal PWRECC is high. Consequently, conductor 40$a$ is not shorted to ground; but instead, its capacitor C' is charged to voltage $V_{DD}$ through transistor 40$c$.

Conversely, when signal OWRECC goes low, transistor N1 turns on and this enables capacitor C' to discharge. However, that discharge will only occur if any of the minterms MIN1 thru MIN136 stay high. If all of those minterms go low during the time period $t_2$ thru $t_3$, then capacitor C' remains charged.

A primary feature of the FIG. 9 OR gate is that it dissipates essentially zero DC power. This is because no constant DC current ever passes through transistor 40$c$ and transistor N1. Also, the FIG. 9 OR gate operates very quickly to sense the presence or absence of the error signal ERi. This sensing time period starts from time $t_2$ (when signal PWRECC goes low) and lasts until either capacitor C or capacitor C' discharges. In no case does the sensing operation require both capacitors to discharge sequentially, or require one capacitor to charge and the other to discharge sequentially.

As with capacitor C, capacitor C' may be formed of a reverse biased P-N diode, or a pair of spaced apart parallel plates; and these components may be lumped at one location or distributed along conductor 40$a$. Preferably, its value is at least 50% larger than capacitor C so that it will hold its charge while capacitor C discharges during time $t_2$–$t_3$. Alternatively, the PWRECC signal to inverter 40$b$ can be delayed slightly to enable capacitor C to start discharging before capacitor C'; and that is the function of AND gate 40$d$.

Various preferred embodiments of the invention have now been described in detail. In addition, however, many changes and modifications can be made to these details without departing from the nature and spirit of the invention.

For example, this invention is not limited to just one specific memory system that employs just one particular error correction code. Clearly, the number of AND gates in FIGS. 3 and 6 plus the minterms that they form can be tailored by the mask programmable contacts to bus 27 to accommodate many different codes. Accordingly, it is to be understood that the invention is not limited to the above details but is defined by the appended claims.

What is claimed is:

1. An error-correcting memory system having a storage means which receives an address during a read cycle and which reads data bits and check bits at said address; and a plurality of logic gates which are coupled in parallel to receive input signal, that are derived from said data bits and check bits, for generating multiple minterms therefrom which correct errors in said data bits; wherein:

each logic gate generates a respective one of said minterms by passing a constant power dissipating current to selectively decode said input signals only when said input signals are at a certain voltage level; and wherein said memory system also includes, a control means for generating a control signal that is in one state during only a small fraction of said read cycle and is otherwise in an opposite state; and an enabling means, coupled between said control means and said logic gates, for reducing power dissipation in said logic gates by forcing said received input signals out of said certain voltage level whenever said control signal is in said opposite state.

2. A memory system according to claim 1 and further including a means for forming new check bits from said data bits which are read from said storage means, and wherein said control means forces said control signal into said opposite state throughout said read cycle when said new check bits are the same as said read check bits.

3. A memory system according to claim 1 wherein said system also includes a write cycle in which data is written into said storage means, and wherein said control means forces said control signal into said opposite state throughout said write cycle.

4. A memory system according to claim 1 wherein said system further includes multiple OR gates which are coupled to selectively OR said minterms together.

5. A memory system having a storage means which receives an address during a read cycle and which reads data bits and check bits at said address, and a plurality of logic gates which are coupled in parallel which correct errors in said data bits; wherein:

each logic gate generates a respective one of said minterms by passing a constant power dissipating current from a common bus to selectively decode said input signals; and wherein said memory system also includes, a control means for generating a control signal that is in one state during only a small fraction of said read cycle and is otherwise in an opposite state; and an enabling means, coupled between said control means and said logic gates, for reducing power dissipating in said logic gates by decoupling said bus from said gates whenever said control signal is in said opposite state.

6. A memory system according to claim 5 and further including a means for forming new check bits from said data bits which are read from said storage means, and wherein said control means forces said control signal into said opposite state throughout said read cycle when said new check bits are the same as said read check bits.

7. A memory system according to claim 5 wherein said system also includes a write cycle in which data is written into said storage means, and wherein said control means forces said control signal into said opposite state throughout said write cycle.

8. A memory system according to claim 5 wherein said system further includes multiple OR gates which are coupled to selectively OR said minterms together.

* * * * *